United States Patent
Kaminski et al.

(10) Patent No.: US 6,194,807 B1
(45) Date of Patent: Feb. 27, 2001

(54) MECHANICAL CONSTRAINT FOR TAPERED END TURNS OF A GENERATOR ROTOR

(75) Inventors: Christopher Anthony Kaminski, Schenectady; Steven Charles Walko, Clifton Park; Robert Francis Lloyd, Whitesboro, all of NY (US)

(73) Assignee: General Electric Co., Schenectady, NY (US)

( * ) Notice: Subject to any disclaimer, the term of this patent is extended or adjusted under 35 U.S.C. 154(b) by 0 days.

(21) Appl. No.: 09/363,014

(22) Filed: Jul. 29, 1999

Related U.S. Application Data

(62) Division of application No. 09/140,227, filed on Aug. 26, 1998, now Pat. No. 5,986,380.

(51) Int. Cl.$^7$ .................................................. H02K 3/46
(52) U.S. Cl. .............................................. 310/270; 310/65
(58) Field of Search ...................... 310/217, 218, 310/214, 215, 258–260, 264, 261, 269–270, 64, 65, 58, 59, 60 R, 61, 91; 29/596–598

(56) References Cited

U.S. PATENT DOCUMENTS

| | | |
|---|---|---|
| 2,844,746 | 7/1958 | Coggeshall . |
| 3,454,805 * | 7/1969 | Fromm ................................. 310/270 |
| 4,010,393 | 3/1977 | Lorch et al. . |
| 4,015,156 | 3/1977 | Johrde . |
| 4,217,515 | 8/1980 | Long et al. . |
| 4,395,816 * | 8/1983 | Pangburn ............................... 310/65 |
| 4,415,822 * | 11/1983 | Aiba ....................................... 310/59 |
| 4,486,676 | 12/1984 | Moore et al. . |
| 4,543,503 | 9/1985 | Kaminski et al. . |
| 4,656,382 * | 4/1987 | Moore et al. ......................... 310/270 |
| 4,709,177 | 11/1987 | Kaminski . |
| 5,063,320 | 11/1991 | Watanabe et al. . |
| 5,113,114 | 5/1992 | Shih et al. . |
| 5,118,979 | 6/1992 | Shih et al. . |
| 5,382,860 | 1/1995 | Fanning et al. . |
| 5,430,340 | 7/1995 | Shih et al. . |
| 5,432,391 | 7/1995 | Zawoysky . |
| 5,644,179 | 7/1997 | Staub et al. . |
| 5,929,550 * | 7/1999 | Kaminski et al. .................... 310/214 |

* cited by examiner

Primary Examiner—Ngoc-Tran Nguyen
(74) Attorney, Agent, or Firm—Nixon & Vanderhye

(57) ABSTRACT

An end turn arrangement for turns in a rotor where individual windings are stacked in tapered radial slots in the rotor, with successive turns having a smaller width in a radial inward direction, the end turns of the individual turns of each stack being vertically aligned along a common edge. The end turns are separated by blocking separators, each including a first anchor component having a first planar exterior surface and a second planar interior engagement surface; and a second slide component having a first non-planar exterior surface and a second planar interior engagement surface; the anchor and slide components having mating guide elements permitting the anchor and slide components to move relative to each other along a straight assembly path.

6 Claims, 7 Drawing Sheets

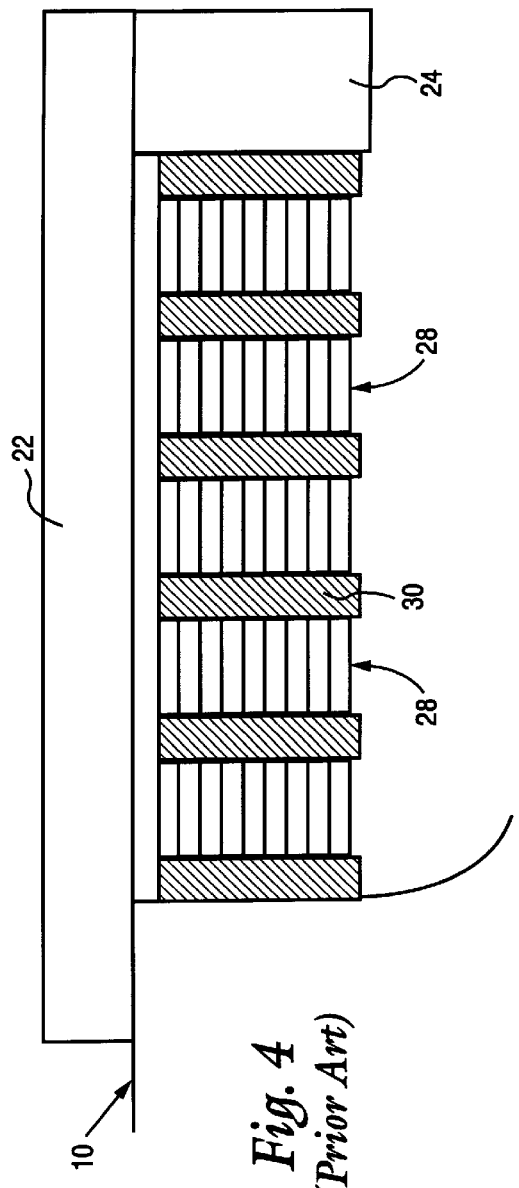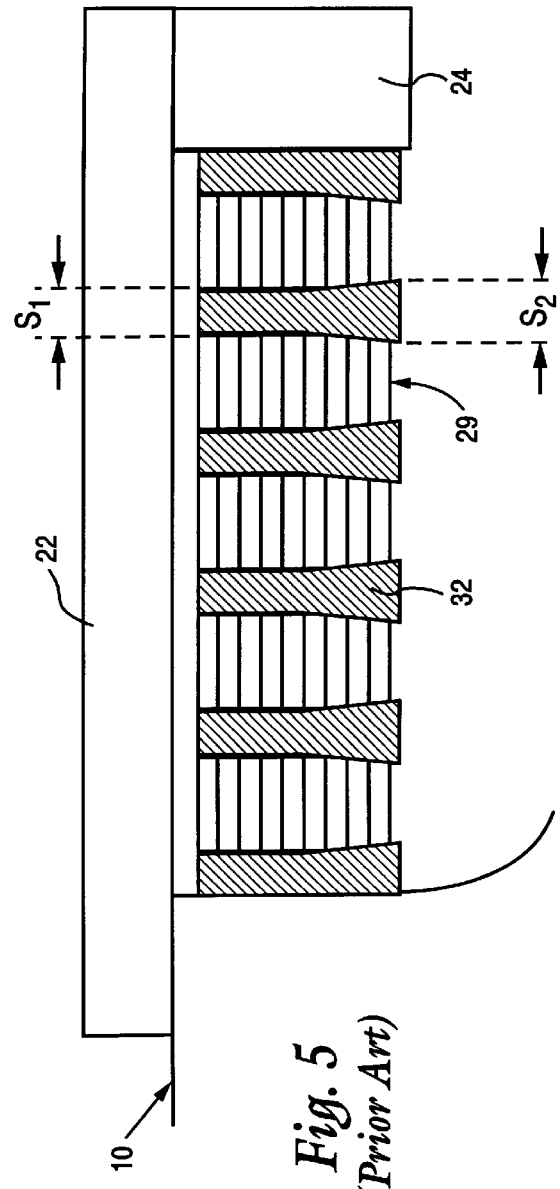

MECHANICAL CONSTRAINT FOR TAPERED END TURNS OF A GENERATOR ROTOR

This is a divisional of application Ser. No. 09/140,227, filed Aug. 26, 1998, now U.S. Pat. No. 5,986,380, the entire content of which is hereby incorporated by reference in this application.

BACKGROUND OF THE INVENTION

This invention relates to generator rotors and, more specifically, to the blocking of end arc portions of the field windings of generator rotors.

Generator fields with C-coil windings in tapered rotor slots have special blocking requirements in the end arc region of the windings. The space between end arcs in adjacent coils is larger for turns located closer to the axis of rotation of the rotor than it is for turns located closer to the peripheral surface of the rotor. Normal assembly procedure calls for location of spacer blocks between coils after the coils have been wound into the field. For windings located in parallel sided rotor slots, such blocks have parallel faces. This allows the blocks to be assembled after all of the coils have been wound. However, for designs with turns located in tapered slots, the blocks need to be wider at the radially inboard end than at the radially outboard opening where they are inserted. These tapered blocks must be assembled against each coil stack as the field is wound. This arrangement, however, does not allow for any adjustment after winding, and does not allow the blocks to be removed without first disassembling entire coils from the rotor.

BRIEF SUMMARY OF THE INVENTION

The invention consists of two primary elements. One involves a change in the construction and arrangement of the coils. The other involves a change in the construction of the blocking components (or, simply, the "blocking") between the end arc portions of the coils.

In accordance with an exemplary embodiment of this invention, individual turns in the end arc portion of a field winding in tapered slot designs are secured against axial movement by adjusting the location of edgewise bends so as to align the edges of the turns in a given coil stack along a common edge, and then inserting appropriately tapered two piece blocking between adjacent coils.

More specifically, and with respect to the coil construction, copper bars are normally arranged in a tapered coil slot with each bar arranged symmetrically with respect to the coil slot centerline. The same is true, of course, for copper bars seated in slots having parallel sides. Normally, in both cases, the symmetry is preserved as the bars progress around the pole face to form the end turns. To facilitate accessibility for a practical blocking strategy in a tapered slot design, however, the coil construction in accordance with this invention is altered to permit the edgewise turns to be aligned along a common edge, i.e., they do not maintain symmetry with the slot centerline. In addition, all of the copper bars are formed to have a common straight length and a common radius of curvature for each of the edgewise bends. Thus, whether the bar has a wide width or a narrow width, the axial separation between inside edges for any given coil remains the same.

The resultant spacing between coils now makes possible the introduction of a two piece blocking that can be assembled into position from above the winding, even though the opening is narrower at the top than at the bottom.

The two mating parts that make up the proposed blocking include a slide and an anchor which share a common inclined but flat mating surface. The slide has two protruding pins which are arranged to line up and fit inside a groove formed into the anchor piece. The groove allows the slide to be assembled radially downward into the block, yet provide restraint against peripheral misalignment. The same effect can be obtained by replacing the two pins with a rectangular protrusion, thus providing a tongue and groove arrangement.

The exposed surface of the slide follows the contour of the coil stack while the exposed surface of the anchor lies against the aligned edge of the next coil stack. Insertion of the slide along side the anchor thus fills the space between coils and provides support for all of the turns in the coil stack. Though the blocks are now wedged tightly in position, there remains the possibility that with thermal cycling, the block assembly could loosen sufficiently that the anchor block shift radially inward. To prevent this occurrence, a plate can be secured across the top of the block, such that it spans the anchor, the slide and the top turn of the adjacent coil.

Thus, in the broader aspects, the invention relates to an end turn arrangement for windings in a rotor where individual turns are stacked in tapered radial slots in the rotor, with successive turns having a smaller width in a radial inward direction, the end turns of the individual turns of each stack being aligned along a common edge.

In another aspect, the invention relates to a blocking separator for use between end turns of windings in a rotor, the blocking separator comprising a first anchor component having a first planar exterior surface and a second planar interior engagement surface; and a second slide component having a first non-planar exterior surface and a second planar interior engagement surface; the anchor and slide components having mating guide elements permitting the anchor and slide components to move relative to each other along a straight assembly path.

BRIEF DESCRIPTION OF THE DRAWINGS

FIG. 4 is a schematic axial section of the end windings of a rotor having parallel slots;

FIG. 5 is a schematic view similar to FIG. 4, but illustrating end windings for rotors with centered taper slots;

DETAILED DESCRIPTION OF THE INVENTION

Figure 1:
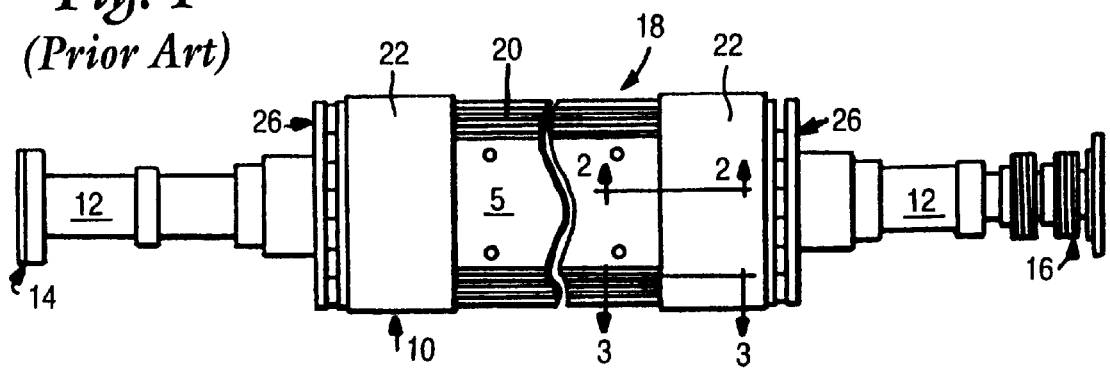
FIG. 1 is a side elevation view of a generator rotor having coil windings and retaining rings.

FIG. 1 illustrates a conventional rotor 10 for a generator (or motor). The rotor has a shaft 12 with a power turbine (or mechanical mode) coupling 14 and supported by bearings (not shown). The rotor shaft also has a collector ring 16 that provides an electrical junction for the rotor field winding.

The rotor has a large diameter body 18 that holds the coil windings 20. The rotor body has longitudinally oriented slots extending radially outwardly from the center of the rotor, and in which the individual turns of the windings are mounted. These slots extend the length of the rotor body, and annular retaining rings 22 cap both ends of the rotor body. The retaining rings are supported at one end by the rotor body (see FIG. 2). Adjacent the retaining rings are fans 26 that cool the retaining rings and other rotor components.

Figure 2:
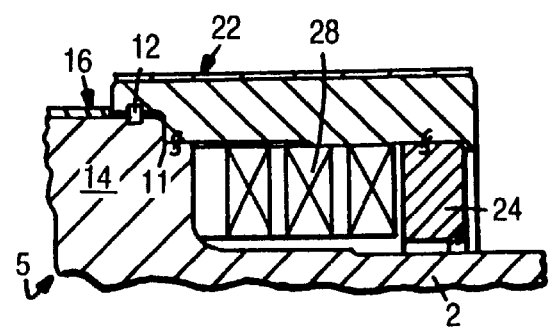
FIG. 2 is a partial axial cross section of the rotor shown in FIG. 1, illustrating a conventional coupling between a retaining ring and a rotor body taken along the line 2—2 of FIG. 1.
Figure 3:
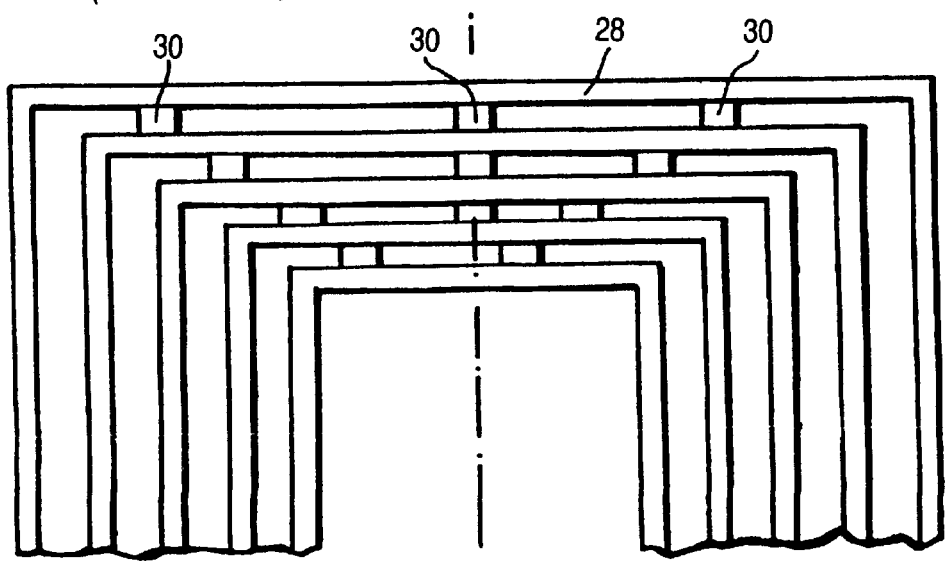
FIG. 3 is a schematic view of the end windings of a rotor, illustrating conventional blocking between adjacent end windings.

As will be appreciated from FIG. 2, the retaining rings 22 slide over the end of the rotor body and are attached to the rotor body by a conventional shrink fit process. The end turns 28 are enclosed by the retaining rings, which thus prevent radially outward movement of the end turns by centrifugal forces generated by the rotor. The end turns extend circumferentially about the rotor and are axially spaced from one another, while the turns between the ends lie parallel to the rotor axis and are circumferentially spaced from each other. In each case, the spacing between adjacent windings is maintained by a predetermined distance by means of blocks 30 as shown in FIG. 3.

Figure 6:
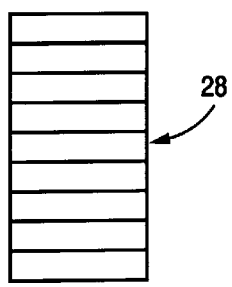
FIG. 6 is a schematic diagram of coil windings aligned in parallel sided rotor slots.
Figure 7:
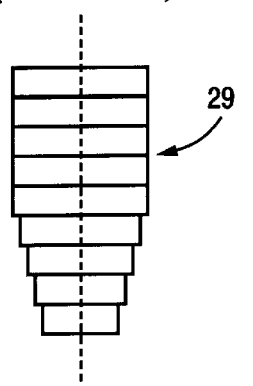
FIG. 7 is a schematic view of coil windings in tapered slots.

In FIG. 4, the spacer blocks 30 are shown at axially spaced locations between the end turns of the windings 28 of the coils. Note that the end turns are vertically aligned with parallel sides, typical of rotor configurations which employ parallel sided slots. The individual turns as they appear in the parallel sided slots of the rotor are shown in FIG. 6. For rotors which have tapered slots, however, the end turns 29 typically appear as shown in FIG. 5, and the turn 29 as they appear in the tapered rotor slots are shown in FIG. 7. Note that because of the tapered configuration of the rotor slots, the end turns require that the spacer blocks 32 be wider at the radially inboard end (closest to the rotor) as indicated at $S_2$ than they are at the radially outboard end, as indicated at $S_1$. Because of the limited access, however, the blocks must be inserted from the outboard end. As a result, these blocks 32 must be put in place against each coil stack as the field is wound. As already noted, this arrangement does not allow for any adjustment after winding, and does not allow the blocks to be removed without disassembling entire coils.

Figure 8:
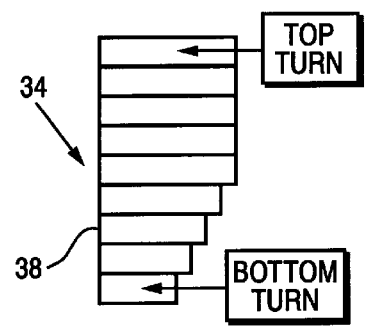
FIG. 8 is a schematic view of an end arc portion of coil windings for a rotor with tapered slots in accordance with this invention.
Figure 9:
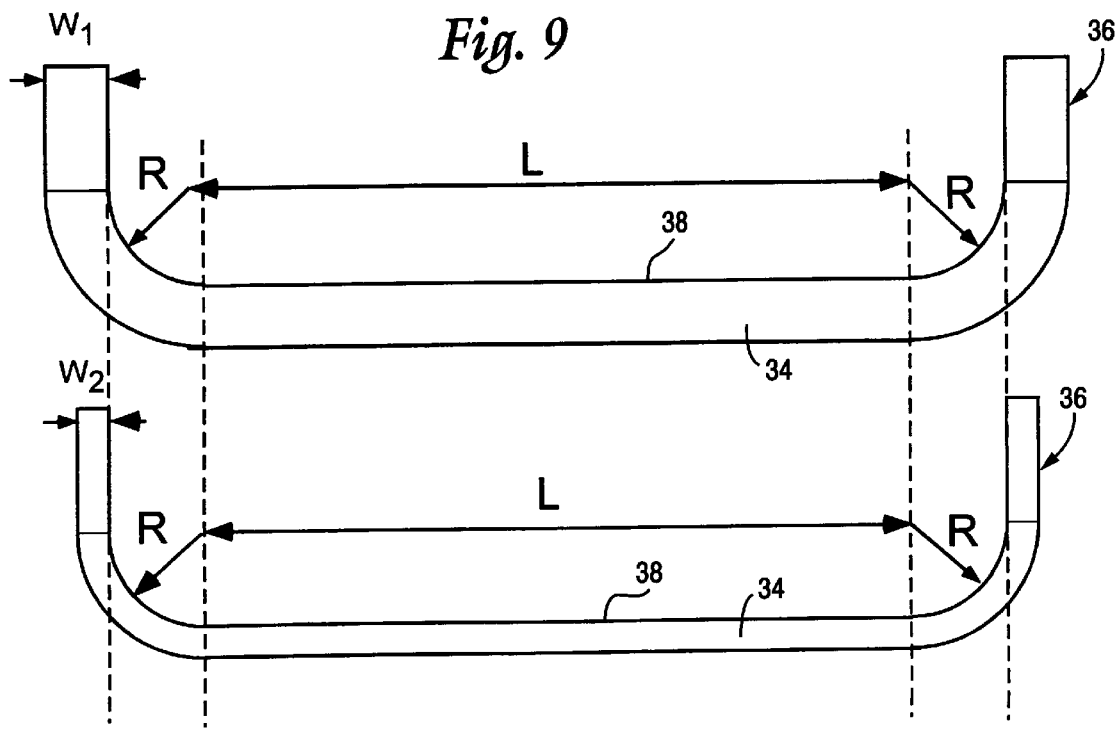
FIG. 9 is a comparison of edgewise bend alignment between top and bottom turns in accordance with this invention.

In accordance with this invention, where the rotor body is formed with tapered slots, the coil construction is modified so that the end turns 34 of the windings 36 are aligned along a common edge 38 as best seen in FIG. 8. In other words, the rotor slot configuration is as shown in FIG. 8 but in the end turn region (outside the rotor), the windings are no longer symmetrical as they are within the rotor slots. With reference to FIG. 9, all of the bars are formed to have a common straight length L in the end turn region and common radii of curvature R at opposite ends. Thus, whether the bar has a wide width $W_1$ (as represented by the upper bar in FIG. 9) or a narrow width $W_2$ as represented by the lower bar in FIG. 9, the axial separation between inside edges for any given coil remains equal to L+2R.

Figure 10:
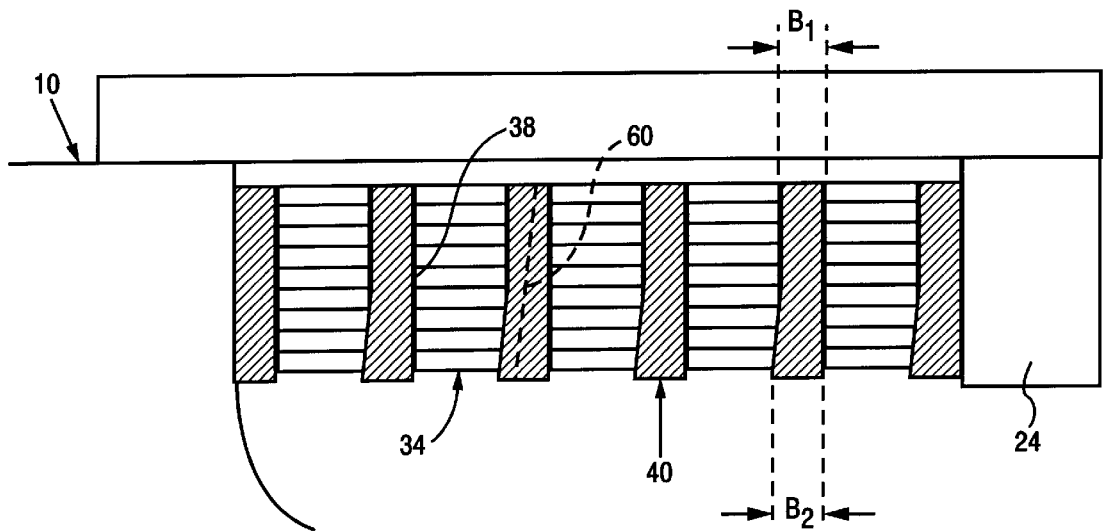
FIG. 10 is a schematic view of a radial/axial section of end windings with asymmetric taper in accordance with the present invention.
Figure 11:
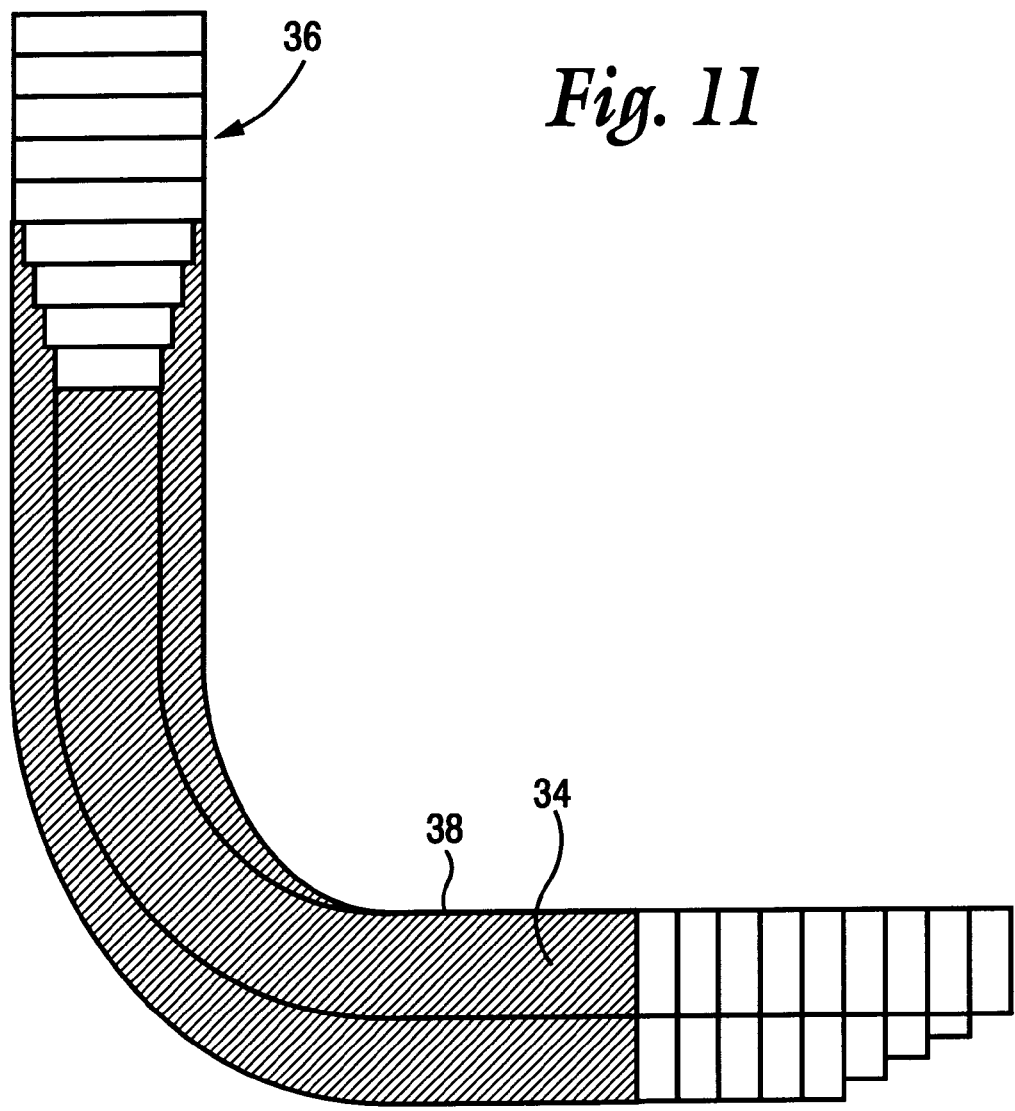
FIG. 11 is a schematic view of the top and bottom tuns in accordance with the present invention, with the end portions rotated through 90° so that they appear to lie in the plane of the edgewise bend.

With this arrangement, an axial spacing pattern is obtained between the end of the rotor body and the centering ring 24 as shown in FIGS. 10 and 11. In this regard, FIG. 11 shows the ends of the windings rotated 90° into a horizontal plane in order to show how the turns appear as they exit the tapered rotor slots, and how they are aligned along the common edge 38 in the end turn region. This spacing arrangement between coils now makes possible the introduction of a two piece block (FIGS. 12–16) that can be assembled into position from above the winding, even though the opening is narrower at the top (see $B_1$ in FIG. 10) than at the bottom (see $B_2$ in FIG. 10).

Figure 12:
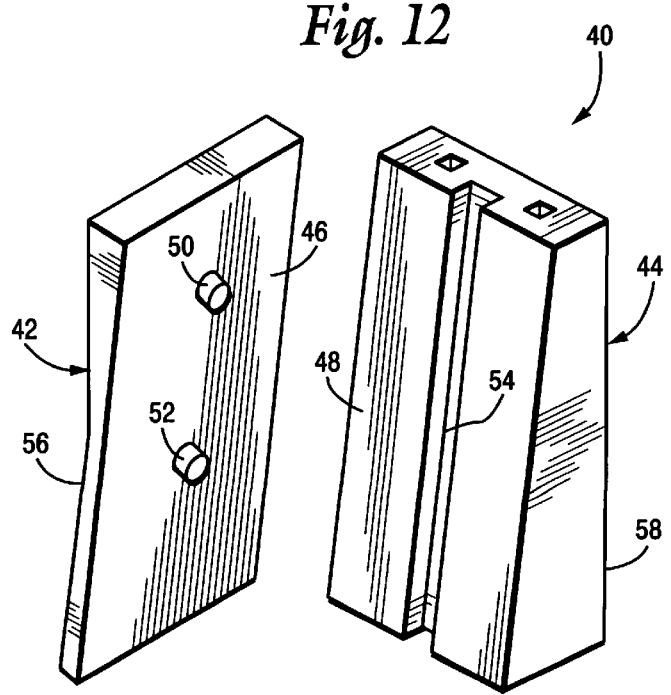
FIG. 12 is a perspective exploded view of a two piece block assembly in accordance with the invention.

With reference now to FIG. 12, the spacer block 40 in accordance with this invention includes two mating parts 42 and 44. The left hand component 42 will be referred to as the slide, while the right hand component 44 will be referred to as the anchor. The slide 42 and the anchor 44 share common flat mating surfaces 46, 48, respectively. The slide has two protruding pins 50, 52 which are arranged to fit inside a groove 54 formed in the anchor 44. The groove 54 allows the slide 42 to be assembled radially downwardly into the block, yet provide restraint against peripheral misalignment, i.e., the slide is constrained to move along a straight assembly path. This same effect can be obtained by replacing the two pins 50, 52 with a rectangular protrusion, thus providing a tongue and groove fit.

Figure 14:
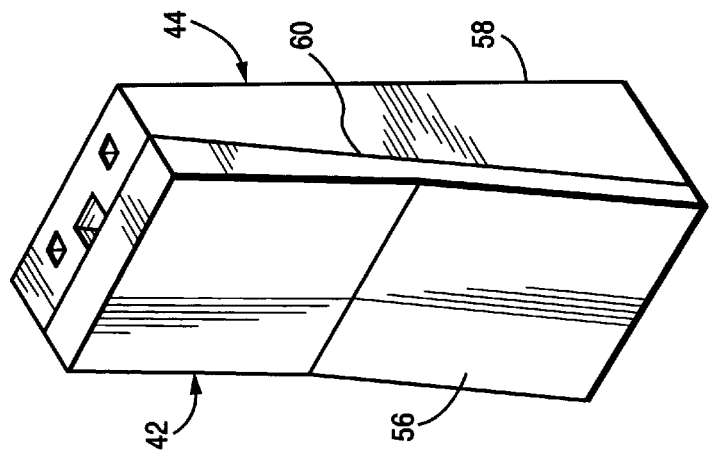
FIG. 14 is a perspective view of the two piece block shown in FIGS. 12 and 13 but fully assembled.
Figure 13:
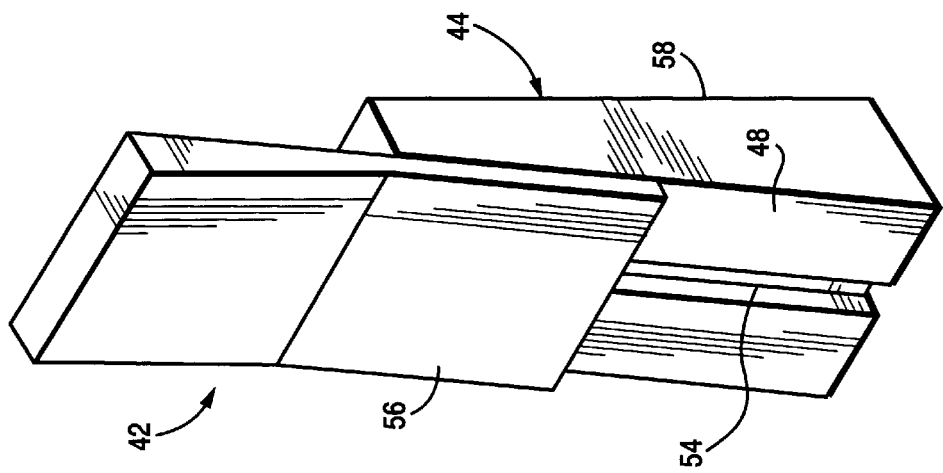
FIG. 13 is a perspective view of the two piece block shown in FIG. 12, but partially assembled.

The exposed non-planar surface 56 of the slide 42 (which serves as one stack engagement surface) follows the contour of the coil stack as best seen in FIG. 10. The exposed planar surface 58 of the anchor (which serves as a second adjacent stack engagement surface) lies against the alignment edge 38 of the next adjacent coil stack. Note that part of surface 56 is parallel to surface 58 while an inclined portion of surface 56 is parallel to surface 48 which, in tun, is parallel to the lower portion of the windings along an edge opposite the alignment edge 38. Assembly of the blocks is made possible by setting the bottom width of the anchor 44 to be no greater than the top opening ($B_1$) of the blocking space as shown in FIG. 10. The bottom width of the slide must then be at least as large as $B_2$–$B_1$, and large enough to fill the space between the coils. FIG. 14 shows the block assembly 40, with the individual components 42, 44 fully assembled. In use, the anchor component 44 is initially placed between the adjacent stacks from the radially outboard ends of the stacks. The slide component 42 is then located so as to place the pins 50, 52 in the groove 54, and the slide inserted as shown in FIGS. 13 and 14. Insertion of the slide 42 alongside the anchor from the radially outboard end fills the space between the coils and provides support to all of the turns in the coil stack. For convenience, the interface or seam 60 between the assembled slide 42 and anchor 44 is shown in phantom in one of the fully inserted blocks 40 shown in FIG. 10.

Figure 16:
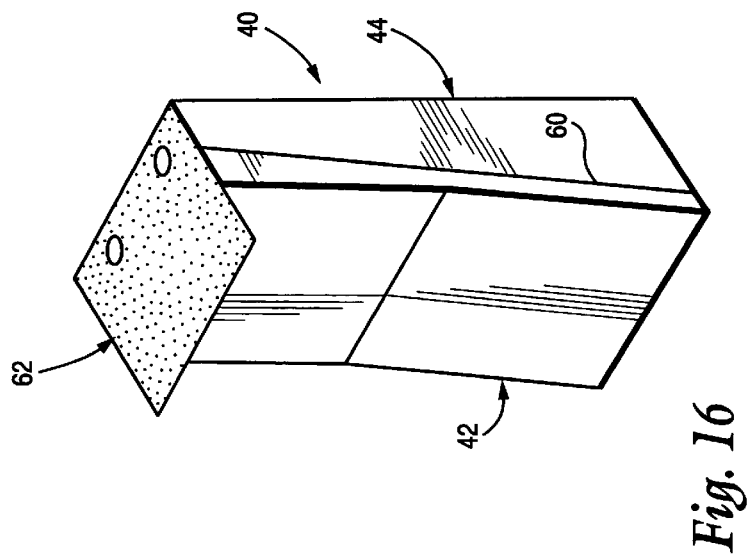
FIG. 16 is a perspective view of the block shown in FIG. 15, but with the cover plate in place.
Figure 15:
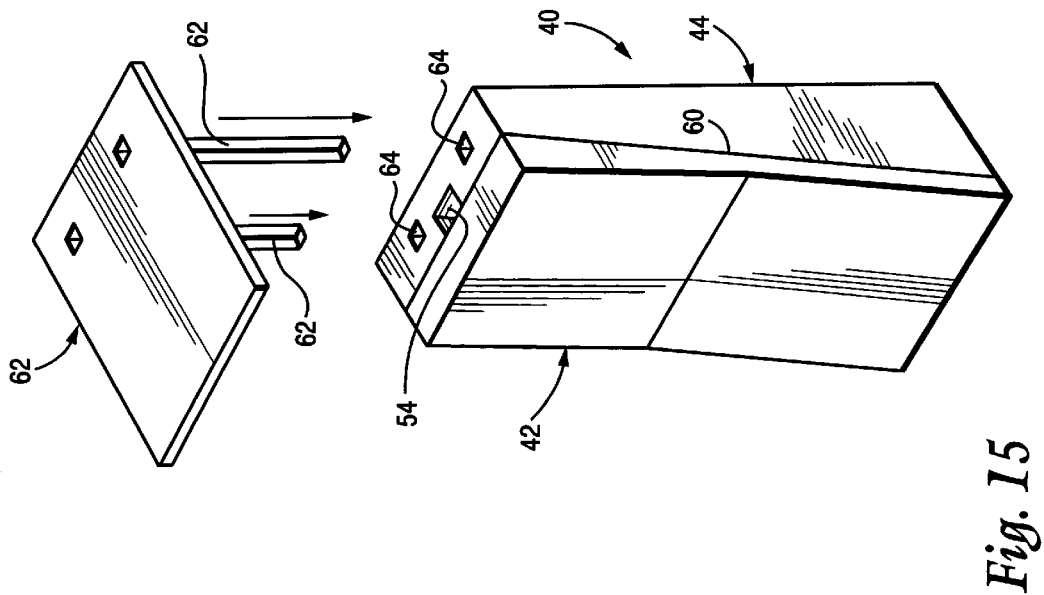
FIG. 15 is an exploded view of an alternative block and cover plate in accordance with the invention.

When the blocks are wedged tightly in position, there remains the possibility, that with thermal cycling, the block assembly could loosen sufficiently that the anchor block shifts radially inwardly. To prevent this undesirable occurrence, a plate 62 may be secured across the top of the block 40 such that it spans the anchor, the slide and the top turn of the adjacent coil as shown in FIGS. 15 and 16. One method of assembly, with pins 62 received in apertures 64, is shown in FIG. 15. The final assembly is shown in FIG. 16. Other suitable means may be used to secure the plate 62 in place.

It will be appreciated that the invention is applicable to all air cooled and hydrogen generators, including all two pole and four pole rotors with either radial flow, axial flow, or diagonal flow rotor body ventilation.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A blocking separator for use between end turns of windings in a rotor, said blocking separator comprising a first anchor component having a first planar exterior surface and a second planar interior engagement surface; and a second slide component having a first non-planar exterior surface and a second planar interior engagement surface; said anchor and slide components having mating guide elements permitting said anchor and slide components to move relative to each other along a straight assembly path; wherein the mating guide elements include a pair of pins on the slide component and a groove in the anchor component.

2. A blocking separator for use between end turns of windings in a rotor, said blocking separator comprising a first anchor component having a first exterior surface and a second planar interior engagement surface; and a second slide component having a first non-planar exterior surface and a second planar interior engagement surface; said anchor and slide components having mating guide elements permitting said anchor and slide components to move relative to each other along a straight assembly path.

3. A blocking separator for use between end turns of windings in a rotor, said blocking separator comprising a first anchor component having a first planar exterior surface and a second planar interior engagement surface; and a second slide component having a first non-planar exterior surface and a second planar interior engagement surface; said anchor and slide components having mating guide elements permitting said anchor and slide components to move relative to each other along a straight assembly path.

4. The blocking separator of claim 3 wherein said first non-planar exterior surface of said slide component has a surface portion parallel to the second planar interior engagement surface of the anchor component and another surface portion parallel to the first planar exterior surface of the anchor component.

5. The blocking separator of claim 4 wherein the mating guide elements include a pair of pins on the slide component and a groove in the anchor component.

6. The blocking separator of claim 3 and including a cap plate secured across and extending beyond one end of the anchor and slide components.

* * * * *